United States Patent
Balzer et al.

(10) Patent No.: US 9,287,747 B2
(45) Date of Patent: Mar. 15, 2016

(54) WIND POWER GENERATOR WITH INTERNAL COOLING CIRCUIT

(75) Inventors: Christoph Balzer, Berlin (DE); Karsten Brach, Berlin (DE); Christian Meyer, Berlin (DE); Axel Möhle, Berlin (DE); Andre Schlawitz, Berlin (DE); Frank Seibicke, Borkheide (DE)

(73) Assignee: SIEMENS AKTIENGESELLSCHAFT, München (DE)

(*) Notice: Subject to any disclaimer, the term of this patent is extended or adjusted under 35 U.S.C. 154(b) by 132 days.

(21) Appl. No.: 13/505,377

(22) PCT Filed: Oct. 25, 2010

(86) PCT No.: PCT/EP2010/066068
§ 371 (c)(1),
(2), (4) Date: May 1, 2012

(87) PCT Pub. No.: WO2011/051228
PCT Pub. Date: May 5, 2011

(65) Prior Publication Data
US 2012/0217756 A1    Aug. 30, 2012

(30) Foreign Application Priority Data

Nov. 2, 2009 (DE) .......... 10 2009 051 651

(51) Int. Cl.
*F03D 1/06* (2006.01)
*H02K 5/20* (2006.01)
(Continued)

(52) U.S. Cl.
CPC .. *H02K 5/20* (2013.01); *H02K 9/10* (2013.01); *H02K 1/32* (2013.01); *H02K 7/1838* (2013.01); *Y02E 10/721* (2013.01); *Y02E 10/725* (2013.01)

(58) Field of Classification Search
USPC ............. 310/57–59, 60 A, 61, 64; 290/44, 55
See application file for complete search history.

(56) References Cited

U.S. PATENT DOCUMENTS 2,991,377 A    7/1961  Willoner et al.
3,610,975 A *  10/1971 Onjanow ................ 310/57
(Continued)

FOREIGN PATENT DOCUMENTS

DE    949 757 B       9/1956
DE    199 190 40 C2   6/2002
(Continued)

OTHER PUBLICATIONS

EPO website machine translation of DE 10307813 A1, Brach et al, Electric machine for wind power generator or pod drive in ship, has axial cooling channels arranged in rotor, forming closed cooling circuit, 20040909, All.*

*Primary Examiner* — Naishadh Desai
(74) *Attorney, Agent, or Firm* — Henry M. Feiereisen LLC

(57) ABSTRACT

A wind power generator with a closed internal cooling circuit has a stator that is implemented as sheet metal and includes a winding system which forms winding heads at the end faces of the stator. The stator is enclosed by a cooling jacket at least in the region of the laminated core, wherein permanent magnets of a rotor are disposed on a magnet wheel jacket embodied as a hollow shaft. The magnet wheel jacket is connected in a rotationally fixed manner to a shaft or shaft stubs by way of support elements at its end faces, wherein in its interior the hollow shaft has at least one tube whose lateral surface area runs at an equidistant clearance from the magnet wheel jacket. Blowers are mounted at the end faces of the rotor.

6 Claims, 2 Drawing Sheets

(51) Int. Cl.
*H02K 9/10* (2006.01)
*H02K 1/32* (2006.01)
*H02K 7/18* (2006.01)

(56) References Cited

U.S. PATENT DOCUMENTS

| | | | | |
|---|---|---|---|---|
| 3,621,908 | A | * | 11/1971 | Pravda ................... F01D 5/088 |
| | | | | 165/104.25 |
| 3,765,480 | A | * | 10/1973 | Fries ............................... 165/86 |
| 4,876,470 | A | * | 10/1989 | Geller ............................ 310/59 |
| 5,038,853 | A | * | 8/1991 | Callaway et al. ............... 165/46 |
| 5,258,676 | A | * | 11/1993 | Reinhardt et al. ............ 310/112 |
| 6,191,511 | B1 | * | 2/2001 | Zysset .......................... 310/60 A |
| 6,700,237 | B1 | * | 3/2004 | Yang .............................. 310/58 |
| 6,794,781 | B2 | * | 9/2004 | Razzell et al. ................ 310/114 |
| 6,943,469 | B2 | * | 9/2005 | Nelson ............................ 310/55 |
| 7,112,905 | B2 | * | 9/2006 | Chang et al. ................... 310/112 |
| 7,466,053 | B1 | * | 12/2008 | Radev ........................... 310/114 |
| 7,538,466 | B2 | * | 5/2009 | Chang et al. .................. 310/112 |
| 7,816,824 | B2 | * | 10/2010 | Jockel ............................ 310/57 |
| 8,203,226 | B2 | * | 6/2012 | Saenz De Ugarte .... F03D 1/005 |
| | | | | 290/44 |
| 8,308,430 | B2 | * | 11/2012 | Bevington et al. ............. 415/177 |
| 2004/0036367 | A1 | * | 2/2004 | Denton et al. ................... 310/61 |
| 2004/0041409 | A1 | * | 3/2004 | Gabrys ........................... 290/55 |
| 2004/0070291 | A1 | * | 4/2004 | Chan et al. ...................... 310/64 |
| 2006/0071575 | A1 | * | 4/2006 | Jansen et al. ................... 310/266 |
| 2007/0189889 | A1 | * | 8/2007 | Yokoi ...................... F03D 3/005 |
| | | | | 415/4.4 |
| 2008/0012346 | A1 | * | 1/2008 | Bertolotti ........................ 290/55 |
| 2008/0309174 | A1 | * | 12/2008 | Jockel ............................. 310/54 |
| 2009/0134629 | A1 | * | 5/2009 | Stiesdal ........................... 290/55 |
| 2011/0187120 | A1 | * | 8/2011 | Bevington et al. .............. 290/55 |
| 2012/0181792 | A1 | * | 7/2012 | Pettersen et al. ................ 290/55 |

FOREIGN PATENT DOCUMENTS

| | | | |
|---|---|---|---|
| DE | 101 07 298 C1 | 7/2002 | |
| DE | 103 07 813 A1 | 9/2004 | |
| DE | 10307813 A1 * | 9/2004 | ............... H02K 9/10 |
| DE | 103 07 813 B4 | 5/2006 | |
| EP | 0 688 090 A1 | 12/1995 | |
| EP | 1 333 561 A2 | 8/2003 | |
| RU | 2032832 C1 | 4/1995 | |
| RU | 2041545 C1 | 8/1995 | |
| RU | 71386 U1 | 3/2008 | |
| SU | 1241354 A1 | 6/1986 | |

* cited by examiner

WIND POWER GENERATOR WITH INTERNAL COOLING CIRCUIT

CROSS-REFERENCES TO RELATED APPLICATIONS

This application is the U.S. National Stage of International Application No. PCT/2010/066068, filed Oct. 25, 2010, which designated the United States and has been published as International Publication No. WO 2011/051228 A2 and which claims the priority of German Patent Application, Serial No. 10 2009 051 651.4, filed Nov. 2, 2009, pursuant to 35 U.S.C. 119(a)-(d).

BACKGROUND OF THE INVENTION

The invention relates to a wind power generator with internal cooling circuit and having a stator that is implemented in sheet metal and comprises a winding system which forms winding heads at the end faces of the stator, wherein the stator is enclosed by a cooling jacket at least in the region of its laminated core, wherein permanent magnets of a rotor are disposed on a magnet wheel jacket embodied as a hollow shaft.

Wind power generators, like other dynamoelectric machines, require cooling of their active parts. In this case the interior space of the wind power generator in particular, i.e. the electrical domain, is at risk from foreign bodies or aggressive media which, inter alia, attack the insulation or have an adverse impact on electrical breakdown strength. This leads to detrimental effects on operation or to the failure of the wind power generator. For this reason it is normal practice in the case of dynamoelectric machines deployed in an environment of said kind to provide a closed internal cooling circuit which if necessary is recooled by means of external coolers.

DE 199 19 040 C2 discloses a synchronous machine having salient pole rotors or non-salient pole rotors for large-scale wind energy installations, in particular in the offshore sector. Said machine has a stator and a rotor, with stator and rotor each having cooling ducts which are arranged as part of a cooling circuit for a cooling medium for cooling stator and rotor. In this case the stator ducts are embodied as recesses in the stator with a ridge delimiting the stator ducts at the outer circumference of the stator and cooling ducts for a further cooling medium in a stator housing being routed helically and in multiple channels around the stator housing. In this way the cooling medium absorbs heat from the rotor in the region of the rotor ducts and discharges said heat to the stator in the region of the stator ducts.

DE 101 07 298 C1 discloses an enclosed surface-cooled electrical machine having a closed internal cooling medium circuit over the rotor body. In this solution cooling medium channels are present in the rotor on different pitch circles of the rotor body cross-section for different flow directions.

SUMMARY OF THE INVENTION

Proceeding on the basis thereof, the object underlying the invention is to provide a dynamoelectric machine, in particular a wind power generator, the interior space of which is sealed off and which nevertheless possesses an adequate and efficient form of cooling. At the same time it is aimed to provide an adequate form of cooling in particular for slow-running wind power generators.

The object addressed is successfully achieved by means of a wind power generator with a closed internal cooling circuit and having a stator that is implemented in sheet metal and comprises a winding system which forms winding heads at the end faces of the stator, wherein the stator is enclosed by a cooling jacket at least in the region of its laminated core, wherein permanent magnets of a rotor are disposed on a magnet wheel jacket embodied as a hollow shaft, wherein the magnet wheel jacket is connected in a rotationally fixed manner to a shaft or shaft stubs by way of support elements at its end faces, wherein in its interior the hollow shaft has at least one tube whose lateral surface area runs at an equidistant clearance from the magnet wheel jacket, and wherein blowers are mounted at the end faces of the rotor.

In this solution the wind power generator is advantageously driven at an average rotational speed by means of only one reduction gear stage. This has the great advantage that in comparison with the completely gearless generator variant it allows the use of blowers arranged directly at the rotor, with the result that separate external blowers requiring to be driven and controlled in addition can be dispensed with.

Cooling ducts are created by means of tubes additionally arranged inside the magnet wheel jacket, said cooling ducts structuring the cooling efficiency and flow profile in the interior space of the wind power generator and thus leading to efficient cooling in the interior space of the wind power generator.

The blowers at the end faces of the rotor are advantageously implemented not simply as pure radial blowers with blower blades attached only at a hub; rather, the blower blades or vanes are interconnected at an axial end by means of a support plate. Said support plates of the respective blowers take on air conducting functions inside the closed interior space of the wind power generator such that fluidic "short circuits" in the flow are avoided. As a result a prescribed cooling flow profile is guaranteed.

An external, in particular removable heat exchanger, in particular an annular cooler, is mounted at an axial end of the wind power generator, advantageously on the B side, and is integrated into the coolant flow in such a way that the coolant flow of the internal cooling circuit is recooled at that point. This type of placement ensures easy accessibility, with the result that replacing said heat exchanger or carrying out maintenance activities thereon is straightforward.

The accessibility of individual components of the wind power generator and/or its functional integrity are/is exceptionally important, in particular in the offshore sector.

BRIEF DESCRIPTION OF THE DRAWING

The invention and further advantageous embodiments of the invention are explained in more detail with reference to the exemplary embodiments depicted in the schematic drawings, in which.

DETAILED DESCRIPTION OF PREFERRED EMBODIMENTS

Figure 1:
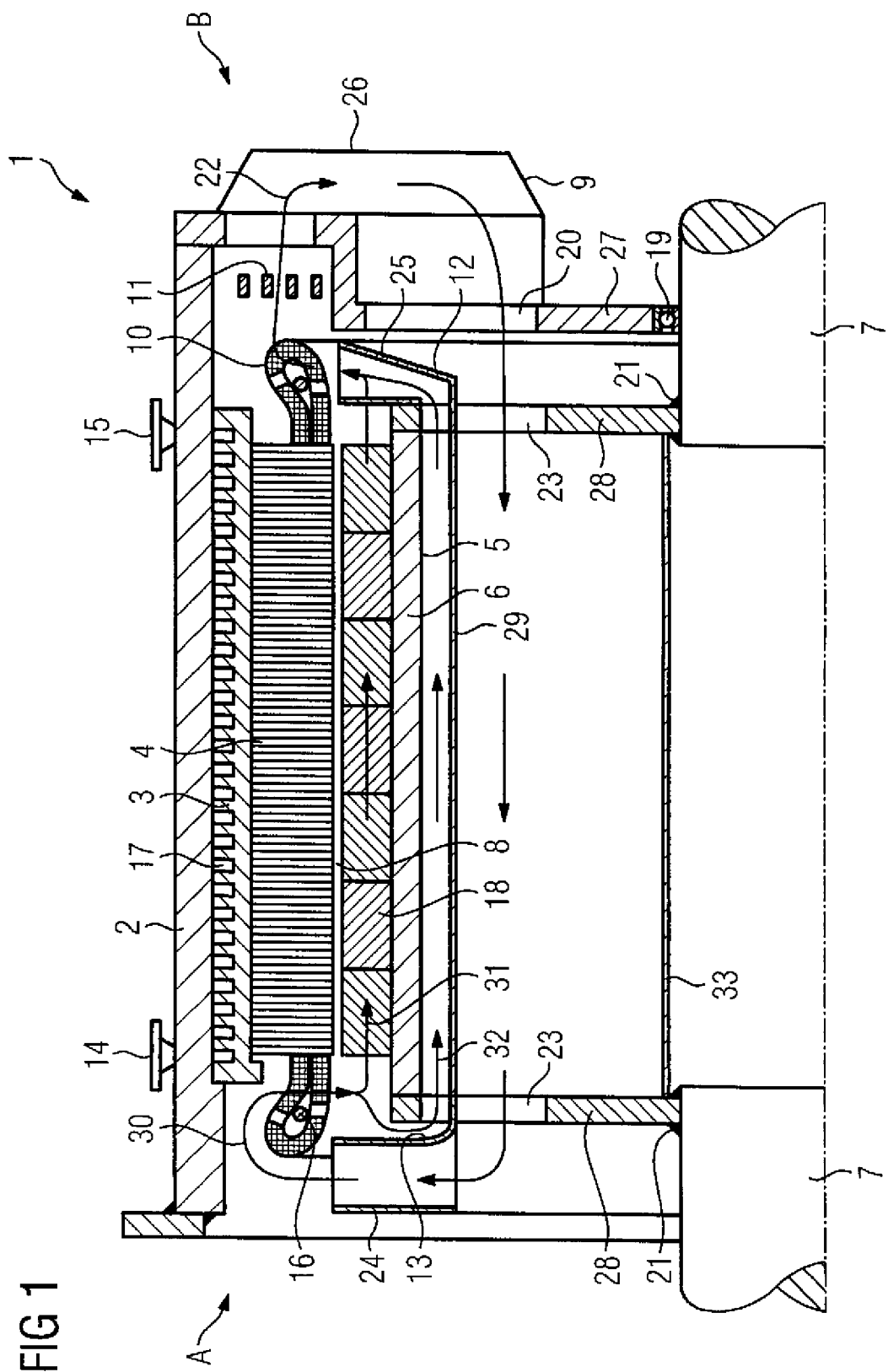
FIG. 1 shows a longitudinal section of a wind generator.

FIG. 1 is a schematic diagram showing a longitudinal section of a wind power generator 1 having a side A and a side B, wherein side A of the wind turbine faces toward a wind power plant that is not shown in further detail. The mechanical coupling to the wind turbine itself is effected by way of a shaft or at least a shaft stub 7 directly or else by way of a gearing mechanism. The wind power generator 1 is accommodated in a housing 2 which has an inlet and an outlet opening 14, 15 which serve for supplying coolant to or conveying coolant away from a cooling jacket 3 which is disposed between the housing 2 and the stator 4. The losses are dissipated from the laminated core of the stator 4 by means of said cooling jacket 3 and the cooling medium flowing in the cooling ducts 17.

Winding heads 10 are integrally formed at the end faces of the laminated core of the stator 4 and on account of their axial overhang said winding heads 10 have to be fixed in position by means of stiffening elements 16 so as to preclude movements of the winding head 10 due for example to electrodynamic compensation processes.

A rotor 5 which has a magnet wheel jacket 6 is connected in a rotationally fixed manner to a shaft or shaft stubs 7 by means of support elements 28, in particular at the axial ends of the magnet wheel jacket 6. The magnet wheel jacket 6 has poles which are embodied in particular by means of permanent magnets 18. In this arrangement, depending on the axial length of the rotor 5 and the pole width, each pole has a plurality of sequentially and/or adjacently disposed permanent magnets 18. Furthermore, the permanent magnets 18 are arranged in pockets of the magnet wheel jacket 6 or on its surface and in the latter case are held in position by means of a suitable device, for example a binding band.

The rotational energy of the wind turbine is converted into electrical energy by means of electromagnetic interactions with the winding system of the stator 4.

Together with the support elements 28, the magnet wheel jacket 6 of the rotor 5 forms a hollow shaft which is used according to the invention to create an inverse flow direction of a gaseous coolant in the closed interior space of the wind power generator 1.

This is successfully achieved in that arranged inside the hollow shaft, i.e. radially inside the magnet wheel jacket 6, are tubes 29, 33 which create predefinable interspaces inside the hollow shaft. In addition, said tubes 29, 33 serve in conjunction with the support elements 28 to stiffen the entire hollow shaft so that in this way mechanical vibrations or impermissible torsional movements are also suppressed.

Disposed at the end faces of the rotor 5 are blowers 24, 25 which impart an adequate flow velocity to the cooling air flow inside the closed dynamoelectric machine. An A-side blower 24 and a B-side blower 25 are accordingly provided. The A-side blower 24 is advantageously attached to the tube 29 that is located radially closest to the magnet wheel jacket 6 and thus, in addition to radially conveying a cooling air flow exiting the hollow shaft, simultaneously provides a separation of the cooling air flows running in the inverse direction there at the start of the hollow shaft. This is achieved in particular in that the A-side blower 24 has a support plate 13 which faces toward the rotor 5.

The B-side blower 25 is likewise mounted on the tube 29 and/or on the support element 28 present there. The blower vanes of said blower 25 are also attached to a support plate 12, with the result that in addition to the cooling air flow being conveyed in the radial direction a separation of the inversely flowing cooling air flow from a heat exchanger 9 is also ensured.

The A-side blower 24 now draws in a cooling air flow 30 from the internal region of the hollow shaft, said cooling air flow having already been precooled by means of a heat exchanger 9. The heat exchanger 9 is mounted on a housing end shield 27 which is supported on the shaft or a shaft stub 7 by way of a bearing 19. The A-side blower 24 can draw in said cooling air flow by way of the internal part of the hollow shaft through openings 20 in the end shield 27 and further openings 23 in the support elements 28. The A-side blower 24 now pushes the precooled cooling air flow 30 radially in the direction of the winding head 10 such that it passes over the winding head 10 there, absorbing heat in the process.

Thereafter the cooling air flow 30 splits into two branch flows. One branch flow 31 flows through the active part of the rotor 5 through any substantially axially running pole gaps that may be present and/or through the air gap 8. The other branch flow 32 is diverted by way of the support plate 13 of the A-side blower 24 into an axial cooling duct running radially inside the pole jacket 6 between magnet wheel jacket and tube 29 and is there drawn in by way of the B-side blower 25. At the end of the active part of the rotor 5 the two branch flows 31 and 32 merge, their flow velocity is increased by means of said B-side blower 25, and they are redirected onto the second winding head 10.

In the further progression of said coolant flow, the latter now flows through guiding elements 11 or ring lines, and after passing the housing 27 is directed through an air cowling 26 onto the heat exchanger 9 installed in the end shield 27. After passing through the heat exchanger 9 the cooling air is again drawn in by the A-side blower 24 through the air duct formed by the tubes 29 and 33 inside the hollow shaft. Said internal cooling circuit is closed in this way.

In the further progression of said coolant flow, the latter now flows through guiding elements 11 or ring lines, and after passing the housing 2 is directed through an air cowling 26 onto the heat exchanger 9 installed in the end shield 27. After passing through the heat exchanger 9 the cooling air is again drawn in by the A-side blower 24 through the air duct formed by the tubes 29 and 33 inside the hollow shaft. Said internal cooling circuit is closed in this way.

The support elements 28 of the shaft stubs 7 attached to the magnet wheel jacket 6 allow a simplified ducting of air by means of welded 21 or bolted-on tubes 29, 33 which are centered on the support elements 28. A bypass is also produced in this way, thereby enabling the heat losses to be dissipated also through convection of the magnet wheel. The support elements 28 are provided with openings 23 in order to allow cooling air to flow through.

If, in a further embodiment, the cooling jacket 3 projects axially even further beyond the winding heads 10 than in FIG. 1, in particular is modified in line with the length of the housing 2, then as well as the cooling air circulating in the interior the winding heads are also cooled in addition, thus leading to a reduced load on the heat exchanger 9.

Figure 2:
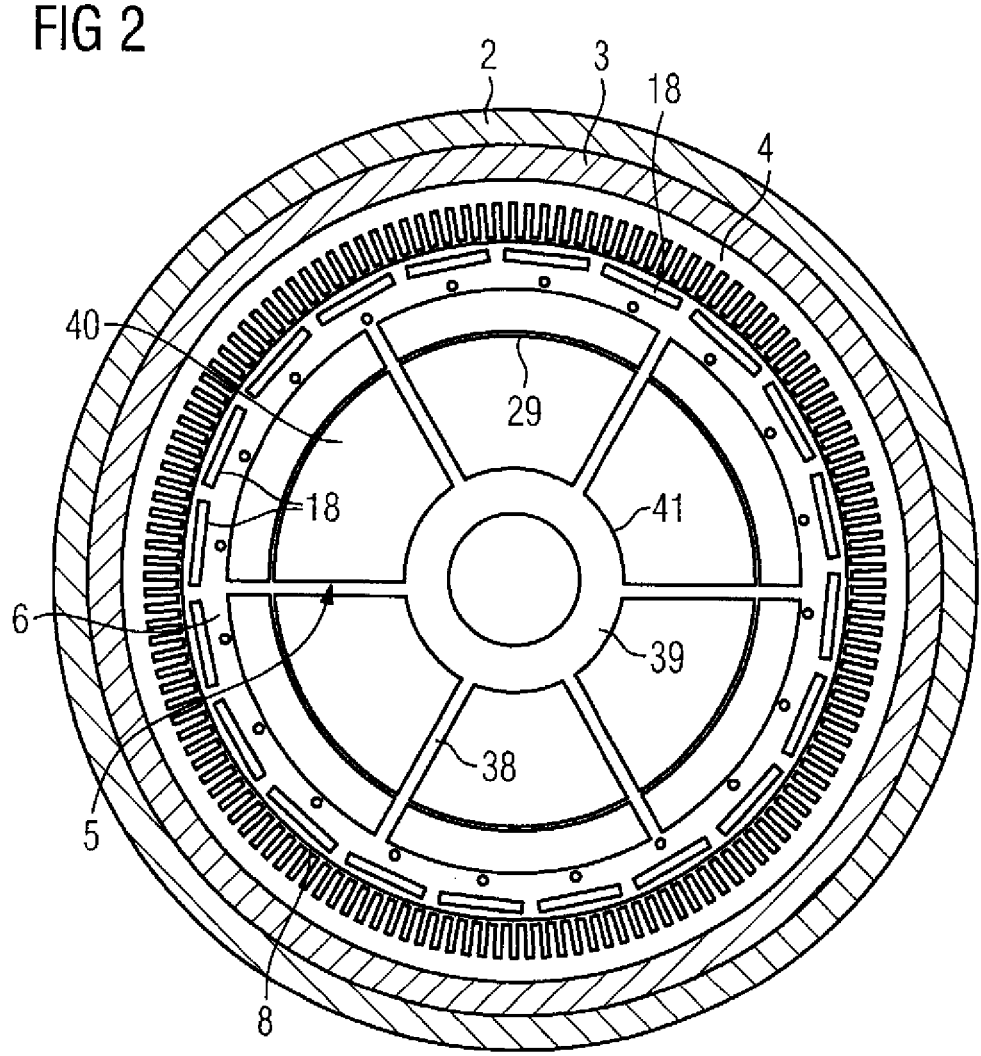
FIG. 2 shows a cross-section of a wind generator.

FIG. 2 shows a cross-section of a wind power generator which is implemented as in FIG. 1 in respect of the stator 4, the housing 2, the cooling jacket 3 and the coolant profile inside the wind power generator 1.

Differences arise simply in the design of the rotor 5, though this also includes the fundamental inventive concept of the circulation of coolant.

In FIG. 1, the support elements 28 depicted there have openings 23 which permit the coolant circulation according to the invention. In FIG. 2, the magnet wheel jacket 6, i.e. the rotor laminated core and the tube 29, is held in position by star-shaped struts 38 which are braced on a shaft 39 which advantageously is also implemented as hollow for weight reasons.

The embodiment of cooling ducts over the axial length of the rotor 5 is now ensured by means of the openings 40 between the struts 38, the magnet wheel jacket 6 and the tube 29. In this arrangement one cooling duct is formed by the surface 41 of the shaft 39 and the inside of the tube 29. The other cooling duct, through which cooling air flows in the inverse direction of said cooling duct during operation, is formed by the inside of the magnet wheel jacket 6 and the outside of the tube 29.

The struts 38 in the respective cooling duct are advantageously designed in such a way that the coolant flow is assisted during operation of the wind power generator 1. This is successfully achieved in particular in that said struts 38 have a blower-vane-shaped structure which assists the axial flow. That is to say that radially below the tube 29 at least some of the struts 38 have a different shape than radially above the tube 29. This assists the coolant flow inside the rotor 5, i.e. radially inside the magnet wheel jacket 6, in the inverse direction.

The invention claimed is:

1. A wind power generator with a closed internal cooling circuit, said wind power generator comprising:
    a stator having a laminated core and a winding system which forms winding heads at end faces of the stator;
    a cooling jacket enclosing the stator at least in a region of the laminated core;
    a rotor having a magnet wheel jacket which is embodied as a hollow shaft, and permanent magnets which are disposed on the magnet wheel jacket;
    a support assembly for connecting the magnet wheel jacket at end faces thereof in a rotationally fixed manner to a shaft or shaft stub of a wind power plant;
    a first tube arranged in an interior of the hollow shaft which is the magnet wheel jacket of the rotor, and having a lateral surface area extending at an equidistant clearance from the magnet wheel jacket; and
    blowers provided with blower vanes and respectively mounted at end faces of the rotor and attached to opposite ends of the first tube arranged in the interior of the hollow shaft which is the magnet wheel jacket of the rotor.

2. The wind power generator of claim 1, wherein the tube is arranged inside the hollow shaft in such a way as to establish cooling ducts inside the hollow shaft as part of the closed internal cooling circuit, thereby permitting a cooling air flow in opposite flow directions inside the hollow shaft.

3. The wind power generator of claim 1, wherein the blower vanes are attached to a support plate configured to simultaneously provide an air conducting function.

4. The wind power generator of claim 1, further comprising a second tube arranged inside the hollow shaft to stiffen the rotor and/or define cooling ducts forming another part of the closed internal cooling circuit.

5. The wind power generator of claim 1, further comprising a heat exchanger arranged on one side of the wind power generator and recooling a gaseous medium of the closed internal cooling circuit in the interior of the hollow shaft.

6. The wind power generator of claim 5, further comprising a housing supported on the shaft or shaft stub, said heat exchanger being removably connected to the housing.

* * * * *